United States Patent
Chen

(10) Patent No.: US 8,954,593 B2
(45) Date of Patent: Feb. 10, 2015

(54) METHOD AND DEVICE FOR IMPLEMENTING REMOTE CONTROL OF A TERMINAL

(75) Inventor: Xingwen Chen, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 924 days.

(21) Appl. No.: 12/221,915

(22) Filed: Aug. 6, 2008

(65) Prior Publication Data

US 2009/0077249 A1 Mar. 19, 2009

(30) Foreign Application Priority Data

Aug. 7, 2007 (CN) .......................... 2007 1 0120035

(51) Int. Cl.
| | |
|---|---|
| G06F 15/16 | (2006.01) |
| H04L 29/06 | (2006.01) |
| H04L 29/08 | (2006.01) |
| G06F 21/30 | (2013.01) |
| H04M 1/725 | (2006.01) |

(52) U.S. Cl.
CPC .............. *H04L 63/10* (2013.01); *H04L 67/025* (2013.01); *H04L 67/125* (2013.01); *G06F 21/305* (2013.01); *H04L 63/08* (2013.01); *H04M 1/72533* (2013.01)
USPC ........... 709/229; 709/203; 709/208; 709/217; 709/223

(58) Field of Classification Search
CPC ..... H04L 67/025; H04L 67/04; H04L 67/125; H04L 63/10; H04L 63/08; G06F 21/305; H04M 1/72533
USPC ......... 709/223–226, 203, 227, 208, 217, 229; 455/406, 419, 420
See application file for complete search history.

(56) References Cited

U.S. PATENT DOCUMENTS

| | | | | |
|---|---|---|---|---|
| 6,501,999 | B1 * | 12/2002 | Cai | 700/82 |
| 7,533,271 | B2 * | 5/2009 | Laksono | 713/150 |
| 7,729,484 | B1 * | 6/2010 | Coppage | 455/406 |
| 7,773,982 | B2 * | 8/2010 | Bishop et al. | 455/420 |
| 7,889,852 | B2 * | 2/2011 | Whitehead | 709/203 |
| 8,155,636 | B2 * | 4/2012 | Cheng | 455/419 |
| 2002/0066029 | A1 | 5/2002 | Yi | |
| 2003/0171113 | A1 * | 9/2003 | Choi | 455/420 |
| 2004/0003030 | A1 * | 1/2004 | Abe | 709/203 |
| 2004/0006647 | A1 | 1/2004 | Kim et al. | |
| 2004/0092282 | A1 * | 5/2004 | Kim et al. | 455/522 |

(Continued)

FOREIGN PATENT DOCUMENTS

| | | |
|---|---|---|
| CN | 1481120 A | 3/2004 |
| CN | 1506868 A | 6/2004 |

(Continued)

*Primary Examiner* — Ramy M Osman
(74) *Attorney, Agent, or Firm* — Kinney & Lange, P.A.

(57) ABSTRACT

Disclosed are a method and a device for remote control of a terminal, in which authentication information is requested from the control terminal after a control request for a controlled terminal is received; and when the identification information from the control terminal is correct, dynamic identification information of the controlled terminal for a control service is obtained and sent to the control terminal. The method and the device according to certain embodiments do not require a dedicated dynamic domain name resolution server. The communication costs of a user may be reduced. Since a successful authentication is a precondition for obtaining dynamic identification information, the communication security is improved.

23 Claims, 2 Drawing Sheets

(56) References Cited

U.S. PATENT DOCUMENTS

| | | | |
|---|---|---|---|
| 2004/0250130 A1* | 12/2004 | Billharz et al. | 713/201 |
| 2005/0259618 A1* | 11/2005 | Ahya et al. | 370/331 |
| 2007/0257982 A1* | 11/2007 | Luo et al. | 348/14.05 |
| 2007/0259657 A1* | 11/2007 | Cheng | 455/419 |
| 2008/0086563 A1 | 4/2008 | Shin et al. | 709/225 |
| 2009/0055525 A1* | 2/2009 | Slepov et al. | 709/224 |
| 2009/0077184 A1* | 3/2009 | Brewer et al. | 709/223 |

FOREIGN PATENT DOCUMENTS

| | | |
|---|---|---|
| GB | 2350259 A | 11/2000 |
| JP | 2001189740 A | 7/2001 |
| KR | 20030062734 A | 7/2003 |
| KR | 20060007206 A | 1/2006 |
| KR | 20060028956 A | 4/2006 |

\* cited by examiner

METHOD AND DEVICE FOR IMPLEMENTING REMOTE CONTROL OF A TERMINAL

BACKGROUND OF THE INVENTION

1. Field of Invention

The present invention relates to computer communication, particularly to a method and a device for implementing remote control.

2. Description of Prior Art

For a user of a dynamic Internet Protocol (IP) address, a precondition under which a control terminal implements a remote control to a controlled terminal is to obtain a dynamic IP address of the controlled terminal. Currently, an approach for obtaining the dynamic IP address of the controlled terminal by the control terminal is generally as follows: a client for maintaining dynamic identification information such as the dynamic IP address is installed at the controlled terminal; the client reports the dynamic IP address of the controlled terminal to a dedicated dynamic domain name resolution server when the client is initiated; and the control terminal is notified of the received dynamic IP address of the controlled terminal by the dynamic domain name resolution server.

Problems exist in the above approach for obtaining the dynamic IP address. A dedicated dynamic domain name resolution server is needed, which makes communication costs higher. It is more difficult to simply operation processes since the operation of dynamic IP address involves three subjects. Moreover, the dynamic IP address of the controlled terminal is only collected and provided, which results in lower communication security in the approach for obtaining the dynamic IP address.

As seen from the above, the current approach for obtaining the dynamic IP address has such disadvantages as high communication cost, complex operations and low communication security. Consequently the precondition of having to obtain the dynamic IP address also has such disadvantages as higher communication costs, more complex operations and lower communication security.

SUMMARY OF THE INVENTION

Accordingly, an object of the present invention is to provide a method and a device for implementing a remote control to improve a communication security effectively.

A technical solution of the present invention is as follows.

A method for implementing a remote control, comprises steps of:

requesting authentication information from a control terminal after a control request for a controlled terminal is received;

when the authentication information from the control terminal is determined to be correct, obtaining dynamic identification information of the controlled terminal for developing a control service, and sending the dynamic identification information of the controlled terminal to the control terminal.

The method further comprises a step of: before the control request is received, the control terminal sending a call request to the controlled terminal; the controlled terminal notifying the control terminal of the call having been continued, when the controlled terminal just receives the call request or a duration/number of the call request is beyond a predetermined threshold; and the control terminal sending the control request to the controlled terminal when the notification is received.

The step of determining whether the authentication information is correct or not comprises:

comparing the authentication information with stored check information;

if the authentication information is in accordance with the check information, the authentication information is determined to be correct;

otherwise, the authentication information is determined to be incorrect.

The control request is not accepted when the authentication information is incorrect.

The step of obtaining the dynamic identification information comprises:

sending to the controlled terminal a dynamic identification information obtaining command; and the controlled terminal sending its own dynamic identification information to the control terminal after the command is received.

The dynamic identification information varies. The controlled terminal further sends the varied dynamic identification information to the control terminal, and the control terminal updates the previously stored dynamic identification information of the controlled terminal with the received dynamic identification information of the controlled terminal.

It is further determined whether the controlled terminal is needed to be woken up or not; and if yes, the controlled terminal is woken up.

The step of waking up the controlled terminal comprises a step of:

generating a wake-up signal and sending the signal to the controlled terminal; and initiating the controlled terminal after the wake-up signal is received.

The controlled terminal operates in an unnetworked state, and a network connection is further established for the controlled terminal.

The control terminal further establishes a control service connection to the controlled terminal, according to the received dynamic identification information of the controlled terminal, and develops the control service.

The dynamic identification information is a dynamic Internet Protocol IP address.

A device for implementing a remote control comprises an authentication unit and a storage unit connected to each other, wherein the authentication unit is used for requesting authentication information from a control terminal after a control request for a controlled terminal is received; and for obtaining dynamic identification information of the controlled terminal for developing a control service and sending the dynamic identification information of the controlled terminal to the control terminal, when the authentication information from the control terminal is determined to be correct; and the storage unit is used for storing and providing check information which is used for determining whether the authentication information is correct or not.

An audio data coding/decoding unit is connected between the authentication unit and the control terminal, which is used for processing, including coding/decoding and transmitting, communication data containing a control request between the authentication unit and the control terminal.

A call detection unit and a call on-off control unit are connected in parallel between the authentication unit and the controlled terminal, wherein the call detection unit is used for receiving a call request from the control terminal and notifying the authentication unit; and the authentication unit is further used for notifying the call on-off control unit of sending a automatic off-hook signal to the control terminal; and the call on-off control unit is used for sending to the control terminal the automatic off-hook signal which is capable of triggering the control request, according to the notification from the authentication unit.

Digital data processing components are further connected between the authentication unit and the control terminal, which are used for processing, including data modulating and demodulating, format-converting, and transmitting, digital data between the authentication unit and the control terminal.

The digital data processing components may comprise a transceiver and an analog front end unit connected in series.

A transmission circuit is further connected between the authentication unit and the controlled terminal, which is used for transmitting communication data between the authentication unit and the controlled terminal.

The transmission circuit is a Wireless Local Area Network WLAN, a Universal Serial Bus USB or an Ethernet Port.

A wake-up unit is further connected between the authentication unit and the controlled terminal, wherein the authentication unit is further used for determining whether the controlled terminal is needed to be woken up, and notifying the wake-up unit of waking up the controlled terminal when needed; and the wake-up unit is used for waking up the controlled terminal according to the notification from the authentication unit.

A networking unit is further connected between the authentication unit and the controlled terminal, wherein the authentication unit is further used for determining whether the controlled terminal is networked or not; and if not, for notifying the networking unit of networking the controlled terminal; and the networking unit is used for establishing a network connection according to the notification from the authentication unit.

The control terminal and the controlled terminal are a mobile phone, a telephone or a computer.

The authentication unit is arranged in an Asymmetrical Digital Subscriber Loop ADSL modem.

A method for controlling a controlled terminal, the method is applied to a system including a controlling terminal, a modem and a controlled terminal, said controlling terminal is connected to said controlled terminal via said modem, the method comprising steps of:

receiving a calling request from said controlling terminal;

upon said call request, establishing a calling connection between said controlling terminal and said modem;

receiving a control request from said controlling terminal;

upon said control request, authenticating said controlling terminal and obtaining a authentication result, said authentication result is used to display whether said controlling terminal has power to control said controlled terminal;

establishing a network connection between said controlled terminal and said modem while said authentication result displays said controlling terminal has power to control said controlled terminal;

obtaining the dynamic identification information of said controlled terminal via said network connection;

sending said dynamic identification information to said controlling terminal;

wherein said controlling terminal controls said controlled terminal based on said dynamic identification information.

An apparatus for controlling a controlled terminal, the apparatus comprising:

means for receiving a calling request from said controlling terminal;

means for upon said call request, establishing a calling connection between said controlling terminal and said modem;

means for receiving a control request from said controlling terminal;

means for upon said control request, authenticating said controlling terminal and obtaining a authentication result, said authentication result is used to display whether said controlling terminal has power to control said controlled terminal;

means for establishing a network connection between said controlled terminal and said modem while said authentication result displays said controlling terminal has power to control said controlled terminal;

means for obtaining the dynamic identification information of said controlled terminal via said network connection;

means for sending said dynamic identification information to said controlling terminal;

wherein said controlling terminal controls said controlled terminal based on said dynamic identification information.

As seen from the above, in the method and the device provided by the present invention for a remote control, authentication information may be requested from the control terminal after a control request for a controlled terminal is received, When the identification information from the control terminal is correct, dynamic identification information of the controlled terminal for a control service may be obtained and sent to the control terminal. The method and the device according to the present invention need not a dedicated dynamic domain name resolution server. The communication costs of a user may be reduced. Since a successful authentication is a precondition for obtaining dynamic identification information, the communication security is improved.

DETAILED DESCRIPTION OF PREFERRED EMBODIMENTS

Figure 1:
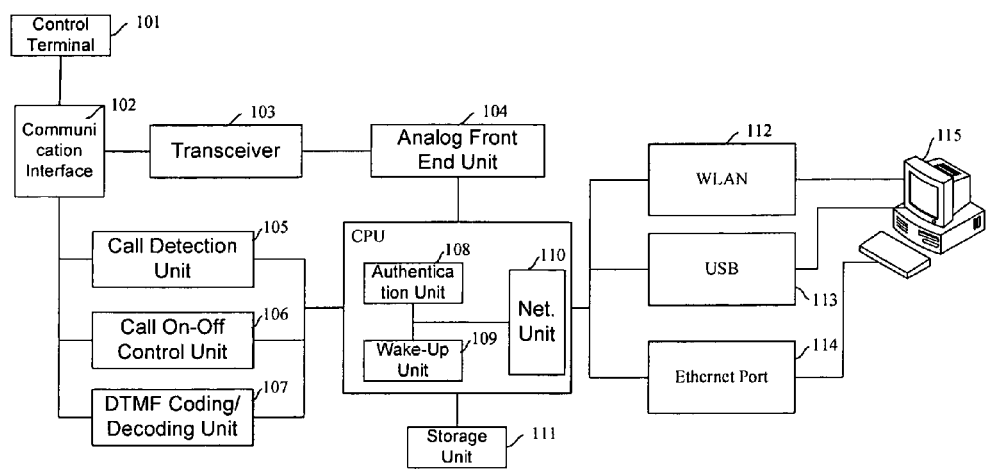
FIG. 1 is an illustrative block diagram of one embodiment of a device for implementing a remote control according to the present invention.

Hereinafter, the present invention will be further described in detail by referring to the drawings.

A method for implementing a remote control, comprises steps of: requesting authentication information from a control terminal after a control request for a controlled terminal is received; when the authentication information from the control terminal is determined to be correct, obtaining dynamic identification information of the controlled terminal for developing a control service, and sending the dynamic identification information of the controlled terminal to the control terminal.

A device for implementing a remote control mainly comprises an authentication unit and a storage unit connected to each other, wherein the authentication unit is used for requesting authentication information from a control terminal after a control request for a controlled terminal is received; and for obtaining dynamic identification information of the controlled terminal for developing a control service and sending the dynamic identification information of the controlled terminal to the control terminal, when the authentication information from the control terminal is determined to be correct. The authentication unit and the storage unit may be directly connected or may be connected through other components and/or devices. The storage unit is used for storing and providing check information which is used for determining whether the authentication information is correct or not.

In addition to the above authentication operation, a wake-up operation and a networking operation may be performed for the controlled terminal.

Referring to FIG. 1, FIG. 1 is an illustrative block diagram of one embodiment of a device for implementing a remote control. In FIG. 1, other elements than a control terminal 101 and a controlled terminal 115 are generally arranged in a modem and constitute a main structure in the modem. Moreover, lines between the elements and a CPU in FIG. 1 indicate that connections between the respective elements and the CPU are possible.

In practice, a call request (which may be a telephone call) to be sent, by the control terminal 101, to the controlled terminal 115 is received by a call detection unit 105 via a communication interface 102. The call detection unit 105 notifies an authentication unit 108 in the CPU through signaling or other means when the call detection unit 105 just receives the call request or a duration/number of the call request(s) is beyond a predetermined threshold. After the notification from the call detection unit 105 is received, the authentication unit 108 notifies the call on-off control unit 106 by sending an automatic off-hook signal. Then, the call on-off control unit 106 sends the automatic off-hook signal to the control terminal 101 for notifying the control terminal 101 of the call having been continued. After the automatic off-hook signal is received by the call on-off control unit 106, the control terminal 101 sends a control request to the CPU.

The control request sent by the control terminal 101 is received by the authentication unit 108 in the CPU via a Dual-Tone Multi-Frequency (DTMF) coding/decoding unit 107. Then, the authentication unit 108 sends an authentication request to the control terminal 101 by the DTMF coding/decoding unit 107. After the authentication request from the authentication unit 108 is received, the control terminal 101 sends authentication information for an authentication to the authentication unit 108 via the DTMF coding/decoding unit 107. After the authentication information from the control terminal 101 is received, the authentication unit 108 obtains check information from a storage unit 111 through reading or other ways. Then, the authentication unit 108 compares the obtained check information with the received authentication information. If the check information is in accordance with the authentication information, the authentication unit 108 determines that the authentication information is correct, and then further determines that the controlled terminal 115 may be controlled by the control terminal 101. Otherwise, the authentication unit 108 determines that the authentication information is incorrect, and further determines that the controlled terminal 115 may not be controlled by the control terminal 101. The authentication unit 108 further controls the call on-off control unit 106 to release the call from the control terminal 101.

In a case where the authentication unit 108 determines that the controlled terminal 115 may be controlled by the control terminal 101, subsequent operations may be different due to different operation states of the controlled terminal 115. Particularly, the operation state of the controlled terminal 115 is obtained by the authentication unit 108 and stored in the storage unit 111. When it is determined that the controlled terminal 115 may be controlled by the control terminal 101, the operation state of the controlled terminal 115 is obtained from the storage unit 111. When the controlled terminal 115 operates in a state, such as disabled, needed to be woken up, the authentication unit 108 notifies a wake-up unit 109 connected thereto of waking up the controlled terminal 115. The wake-up unit 109 generates a wake-up signal (which can be a data package or a level) according to the notification from the authentication unit 108, and sends the wake-up signal to the controlled terminal 115 via a transmission circuit such as a Wireless Local Area Network (WLAN), a Universal Serial Bus (USB), or a Ethernet Port. The controlled terminal 115 is initiated when the wake-up signal is received. When the controlled terminal 115 operates in an unnetworked state, the authentication unit 108 notifies a networking unit 110 connected thereto of networking for the controlled terminal 115. The networking unit 110 establishes a network connection to the controlled terminal 115 according to the notification from the authentication unit 108.

When the controlled terminal 115 is in a networked state and may be controlled by the control terminal 101, the authentication unit 108 sends a dynamic identification information obtaining command to the controlled terminal 115 via the transmission circuit. When the dynamic identification information obtaining command is received, the controlled terminal 115 sends dynamic identification information, such as its own dynamic IP address, to the authentication unit 108. Then the authentication unit 108 sends to the control terminal 101 the received dynamic identification information of the controlled terminal 115 via Internet or the DTMF coding/decoding unit 107. Hereinafter, the control terminal 101 establishes a control service connection, such as HTTP or FTP, to the controlled terminal 115 according to the dynamic identification information of the controlled terminal 115, and develop a control service such as data acquisition.

In practice, if the dynamic identification information of the controlled terminal 115 varies, the controlled terminal 115 sends the varied dynamic identification information to the control terminal 101. Then the control terminal 101 uses new dynamic identification information of the controlled terminal 115 to update the dynamic identification information of the controlled terminal 115 stored previously, and then establishes the control service connection to the controlled terminal 115 according to the updated dynamic identification information of the controlled terminal 115 and develops the control service.

It should be noted that the data involved in the control service may be divided into audio data and digital data. The audio data is generally processed (including coded/decoded and transmitted) by the DTMF coding/decoding unit 107. The digital data is generally processed (including data modulated/demodulated, format-converted and transmitted) by a transceiver 103 and an analog front end unit 104 connected to each other. A divider for dividing the audio data and the digital data transmitted is generally connected between the communication interface 102 and the transceiver 103, and between the communication interface 102 and the call detection unit 105. The DTMF coding/decoding unit 107 is replaced with other audio data coding/decoding unit.

Figure 2:
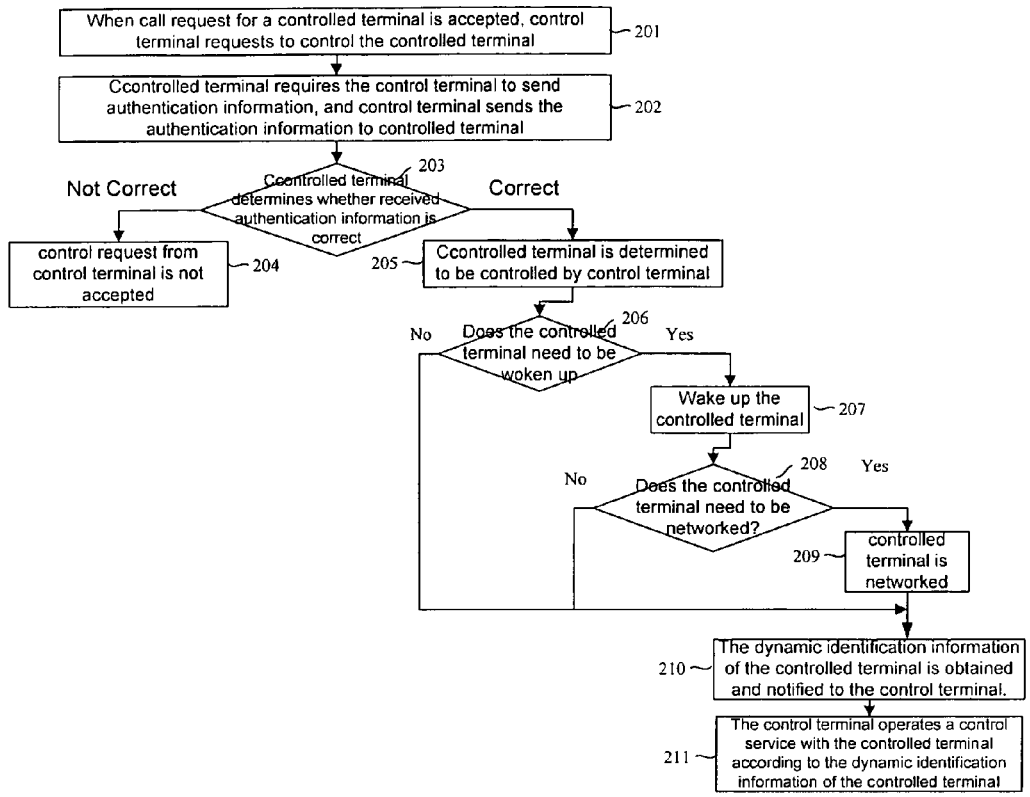
FIG. 2 is a flow chart of one embodiment of a method of implementing a remote control according to the present invention.

A complete flow for implementing a remote control is shown in FIG. 2. Referring to FIG. 2, FIG. 2 is a flow chart of one embodiment of a method of implementing a remote control according to one embodiment. The flow comprises the following steps:

In step 201, the control terminal sends a call request to the controlled terminal, and the control terminal controls the controlled terminal when the call request is accepted.

In step 202, the controlled terminal requires the control terminal to send authentication information, and the control terminal sends the authentication information to the controlled terminal.

In step 203, the controlled terminal determines whether the received authentication information is correct or not. If yes, the process goes to step 205; otherwise, the process goes to step 204 and is ended.

In step 204, the controlled terminal does not accept the control request from the control terminal and releases the call from the control terminal.

In step 205, the controlled terminal is determined to be controlled by the control terminal.

In step 206, it is determined whether the controlled terminal is needed to be woken up or not. If yes, the process goes to step 207; otherwise, the process goes to step 210 directly.

In step 207, the controlled terminal is woken up.

In step 208, it is determined whether the controlled terminal is needed to be networked or not. If yes, the process goes to step 209; otherwise, the process goes to step 210 directly.

In step 209, the controlled terminal is networked.

In step 210, the dynamic identification information of the controlled terminal is obtained and notified to the control terminal.

In step 211, the control terminal establishes a control connection to the controlled terminal and develops a control service according to the dynamic identification information of the controlled terminal.

Figure 3:
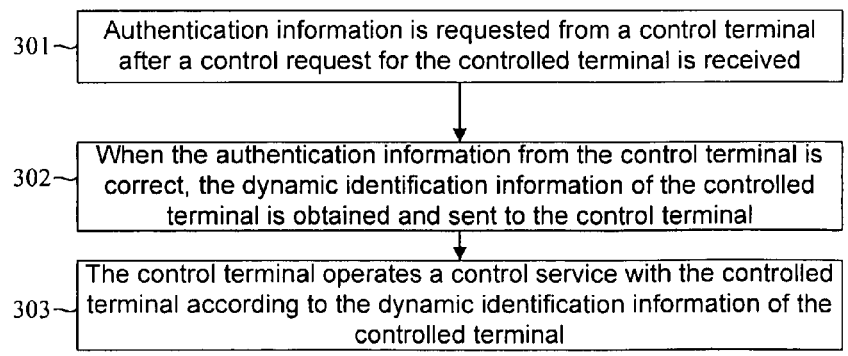
FIG. 3 is a simplified flow chart for implementing a remote control according to the present invention.

It is appreciated from the description of FIGS. 1 and 2 that authentication is a feature of certain embodiments. Thus the authentication is illustrated in FIG. 3. Referring to FIG. 3, FIG. 3 is a simplified flow chart for implementing a remote control according to the present invention. The flow comprises the following steps:

In step 301, authentication information is requested from the control terminal after the control request for the controlled terminal is received.

In step 302, when the authentication information from the control terminal is correct, the dynamic identification information of the controlled terminal is obtained and sent to the control terminal.

In step 303, the control terminal performs control service based on the dynamic identification information of the controlled terminal.

The control terminal and the controlled terminal may a mobile phone, telephone or computer. The present invention may be applied in applications such as an ADSL architecture, a Wimax system.

As seen from the above, the method and the device according to the present invention need not a dedicated dynamic domain name resolution server. The communication costs of a user may be reduced and the processes are simplified. Furthermore, since a successful authentication is a precondition for obtaining dynamic identification information, the communication security is improved.

What is claimed is:

1. A method of implementing a remote control, the method comprising:
    a remote control terminal sending a call request to a controlled terminal in a sleep mode of the controlled terminal;
    the controlled terminal notifying the remote control terminal of continuing of the call, when the controlled terminal just receives the call request or a duration or number of the call request exceeds a predetermined threshold;
    the remote control terminal sending a control request to the controlled terminal when the notification is received;
    the controlled terminal requesting authentication information from the remote control terminal after the controlled terminal receives the control request;
    the remote control terminal transmitting authentication information to the controlled terminal;
    when the authentication information from the remote control terminal is determined to be correct at the controlled terminal, the controlled terminal being woken up from sleep mode and obtaining dynamic identification information of the controlled terminal for developing a control service; and
    sending the dynamic identification information of the controlled terminal to the remote control terminal,
    wherein the dynamic identification information is a dynamic Internet Protocol (IP) address.

2. The method according to claim 1, wherein determining whether the authentication information is correct comprises:
    comparing the authentication information with stored check information;
    determining the authentication information to be correct if the authentication information is in accordance with the check information or determining the authentication to be incorrect if the authentication is not in accordance with the check information.

3. The method according to claim 1 further comprising rejecting the control request when the authentication information is incorrect.

4. The method according to claim 1, wherein obtaining the dynamic identification information comprises:
    sending to the controlled terminal, a dynamic identification information obtaining command to obtain the dynamic identification information of the controlled terminal; and
    sending, by the controlled terminal, the dynamic identification information to the control terminal after the command is received.

5. The method according to claim 1, wherein,
    the dynamic identification information varies; wherein the controlled terminal is configured to send the varied dynamic identification information to the control terminal; and
    wherein the control terminal is configured to update the previously stored dynamic identification information of the controlled terminal with the received dynamic identification information of the controlled terminal.

6. The method according to claim 1, further comprising determining whether the controlled terminal needs to be woken up; and
    waking the controlled terminal if it is determined that the control terminal needs to be woken up.

7. The method according to claim 6, wherein waking up the controlled terminal comprises:
    generating a wake-up signal and sending the signal to the controlled terminal; and initiating the controlled terminal after the wake-up signal is received.

8. The method according to claim 1, wherein that the controlled terminal operates in an un-networked state, and a network connection is further established for the controlled terminal.

9. The method according to claim 1, wherein the control terminal is configured to establish a control service connection to the controlled terminal, according to the received dynamic identification information of the controlled terminal, and configured to develop the control service.

10. A device for implementing a remote control, wherein the device comprises:
   an authentication unit and a storage unit connected to each other, wherein the authentication unit is configured to request authentication information from a control terminal after a control request for a controlled terminal is received at the controlled terminal, configured to obtain dynamic identification information of the controlled terminal at the controlled terminal for developing a control service and configured to send the dynamic identification information of the controlled terminal to the control terminal, when the authentication information from the control termination is determined to be correct at the controlled terminal; and
   a call detection unit and a call on-off control unit being connected in parallel between the authentication unit and the controlled terminal, wherein:
      the call detection unit is configured to receive a call request from the control terminal and notify the authentication unit;
      the authentication unit is configured to notify the call on-off control unit of sending an automatic off-hook signal to the control terminal; and
      the call on-off control unit is configured to send to the control terminal the automatic off-hook signal which is capable of triggering the control request according to the notification from the authentication unit;
   wherein the storage unit is configured to store and provide check information which is used for determining whether the authentication information is correct; and
   wherein the dynamic identification information is a dynamic Internet Protocol (IP) address.

11. The device according to claim 10, wherein an audio data coding/decoding unit is connected between the authentication unit and the control terminal, and is configured to process, including coding/decoding and transmitting, communication data containing a control request between the authentication unit and the control terminal.

12. The device according to claim 10, wherein digital data processing components are connected between the authentication unit and the control terminal, which are configured to process, including data modulating and demodulating, format-converting, and transmitting, digital data between the authentication unit and the control terminal.

13. The device according to claim 12, wherein the digital data processing components comprise a transceiver and an analog front end unit connected in series.

14. The device according to claim 10, wherein a transmission circuit is connected between the authentication unit and the controlled terminal, and is configured to transmit communication data between the authentication unit and the controlled terminal.

15. The device according to claim 10, wherein a wake-up unit is connected between the authentication unit and the controlled terminal, wherein
   the authentication unit is configured to determine whether the controlled terminal is needed to be woken up, and configured to the wake-up unit of waking up the controlled terminal when needed; and
   the wake-up unit is configured to wake up the controlled terminal according to the notification from the authentication unit.

16. The device according to claim 10, wherein a networking unit is further connected between the authentication unit and the controlled terminal, wherein
   the authentication unit is configured to determine whether the controlled terminal is networked; and
   configured to notify the networking unit of networking the controlled terminal if the controlled terminal is not networked; and
   wherein the networking unit is configured to establish a network connection according to the notification from the authentication unit.

17. A method for controlling a controlled terminal, the method is applied to a system including a controlling terminal, a modem and a controlled terminal, said controlling terminal is connected to said controlled terminal via said modem, the method comprising:
   receiving a calling request from said controlling terminal;
   upon said call request, establishing a calling connection between said controlling terminal and said modem;
   receiving a control request from said controlling terminal;
   upon said control request, authenticating said controlling terminal and obtaining a authentication result, said authentication result is used to display whether said controlling terminal has power to control said controlled terminal;
   establishing a network connection between said controlled terminal and said modem while said authentication result indicates that said controlling terminal has power to control said controlled terminal;
   obtaining the dynamic identification information of said controlled terminal via said network connection; and
   sending said dynamic identification information to said controlling terminal;
   wherein said controlling terminal controls said controlled terminal based on said dynamic identification information,
   wherein the dynamic identification information is a dynamic Internet Protocol (IP) address,
   wherein said establishing a network connection between said controlled terminal and said modem comprises:
      determining whether said controlled terminal is in network work state;
      establishing said network connection between said controlled terminal and said modem while said controlled terminal is not in network work state.

18. The method according to claim 17, wherein said authenticating said controlling terminal comprising:
   sending an authentication request to said controlling terminal;
   receiving a first authentication information sent by said controlling terminal based on said authentication request;
   obtaining a second authentication information from a storage;
   comparing said first authentication information to said second authentication information.

19. The method according to claim 17, wherein said obtaining the dynamic identification information of said controlled terminal comprises:
- sending a dynamic identification information request to said controlled terminal;
- receiving said dynamic identification information sent by said controlled terminal based on said dynamic identification information request.

20. An apparatus for controlling a controlled terminal, the apparatus comprising:
- a call detection unit for receiving a calling request from a controlling terminal and for establishing a calling connection between said controlling terminal and a modem;
- an authentication unit for receiving a control request from said controlling terminal, and, upon receiving said control request, for authenticating said controlling terminal and obtaining a authentication result, said authentication result is used to display whether said controlling terminal has power to control said controlled terminal; and
- a networking unit for establishing a network connection between said controlled terminal and said modem while said authentication result indicates that said controlling terminal has power to control said controlled terminal;
- wherein said authentication unit is further configured for obtaining dynamic identification information of said controlled terminal via said network connection, and for sending said dynamic identification information to said controlling terminal;
- wherein said controlling terminal controls said controlled terminal based on said dynamic identification information;
- wherein the dynamic identification information is a dynamic Internet Protocol (IP) address; and
- wherein said networking unit comprises:
    - means for determining whether to wake up said controlled terminal;
    - means for waking up said controlled terminal;
    - means for determining whether said controlled terminal is in network work state;
    - means for establishing said network connection between said controlled terminal and said modem while said controlled terminal is not in network work state.

21. The apparatus according to claim 20, wherein said authentication unit comprises:
- means for sending an authentication request to said controlling terminal;
- means for receiving a first authentication information sent by said controlling terminal based on said authentication request;
- means for obtain a second authentication information from a storage;
- means for comparing said first authentication information to said second authentication information.

22. The apparatus according to claim 20, wherein said networking unit comprises:
- means for determining whether to wake up said controlled terminal;
- means for waking up said controlled terminal;
- means for determining whether said controlled terminal is in network work state;
- means for establishing said network connection between said controlled terminal and said modem while said controlled terminal is not in network work state.

23. The apparatus according to claim 20, wherein said authentication unit comprises:
- means for sending a dynamic identification information request to said controlled terminal;
- means for receiving said dynamic identification information sent by said controlled terminal based on said dynamic identification information request.

* * * * *